(12) United States Patent
Yan et al.

(10) Patent No.: US 12,114,395 B2
(45) Date of Patent: Oct. 8, 2024

(54) SYSTEM AND METHOD FOR AUTOMATED RECOVERY TO RE-PROVISION A SUBSCRIBER OF A COMMUNICATION NETWORK

(71) Applicant: Verizon Patent and Licensing Inc., Basking Ridge, NJ (US)

(72) Inventors: Lixia Yan, Basking Ridge, NJ (US); Javier A Ferro, Somerset, NJ (US); Marc Chiaverini, Randolph, NJ (US); Barry F Hoffner, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 296 days.

(21) Appl. No.: 17/736,123

(22) Filed: May 4, 2022

(65) Prior Publication Data

US 2023/0362620 A1    Nov. 9, 2023

(51) Int. Cl.
*H04W 8/18*   (2009.01)
*H04W 4/24*   (2018.01)
*H04W 24/08*  (2009.01)
*H04W 60/04*  (2009.01)
*H04W 76/10*  (2018.01)

(52) U.S. Cl.
CPC ............ *H04W 8/18* (2013.01); *H04W 4/24* (2013.01); *H04W 24/08* (2013.01); *H04W 60/04* (2013.01); *H04W 76/10* (2018.02)

(58) Field of Classification Search
CPC ......... H04W 8/18; H04W 76/10; H04W 4/24; H04W 24/08; H04W 60/04
See application file for complete search history.

(56) References Cited

U.S. PATENT DOCUMENTS

2015/0373206 A1*  12/2015  Mohammed ............ H04W 4/24
                                                455/406

* cited by examiner

Primary Examiner — Curtis B Odom

(57) ABSTRACT

One or more computing devices, systems, and/or methods for automated recovery to re-provision a subscriber of a communication network are provided. A communication session establishment request for a user equipment of a subscriber to utilize a communication network may be received. Subscriber location information, session management subscription data, and policy data associated with the subscriber may be retrieved. A subscriber not found response may be received from a charging component as a response to a charging subscriber request for the charging component to track network and service utilization by the user equipment due to a prior failure to register the subscriber with the charging component. Accordingly, an automated self-healing action may be performed to re-provision the subscriber with the charging component for registering the subscriber for network and service utilization tracking by the charging component.

20 Claims, 8 Drawing Sheets

SYSTEM AND METHOD FOR AUTOMATED RECOVERY TO RE-PROVISION A SUBSCRIBER OF A COMMUNICATION NETWORK

BACKGROUND

A communication network may provide devices with voice communication capabilities and/or data capabilities. A subscriber may initially activate a device with the communication network in order for the device to utilize communication functionality, data transfer functionality, and/or services of the communication network, such as where a mobile device is registered to make and receive phone calls and use data for web browsing and running applications on the mobile device. During activation, various information may be collected, created, and/or stored within the communication network for the subscriber and the device. Such information may relate to subscriber location information (e.g., whether the subscriber is located in an eastern or western region), session management subscription data (e.g., whether the subscriber is allowed to use 4G, 5G, data/internet, calling functionality, etc.), a charging subscriber profile (e.g., a subscription plan level, data rates, data limits, etc.), and/or other information.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
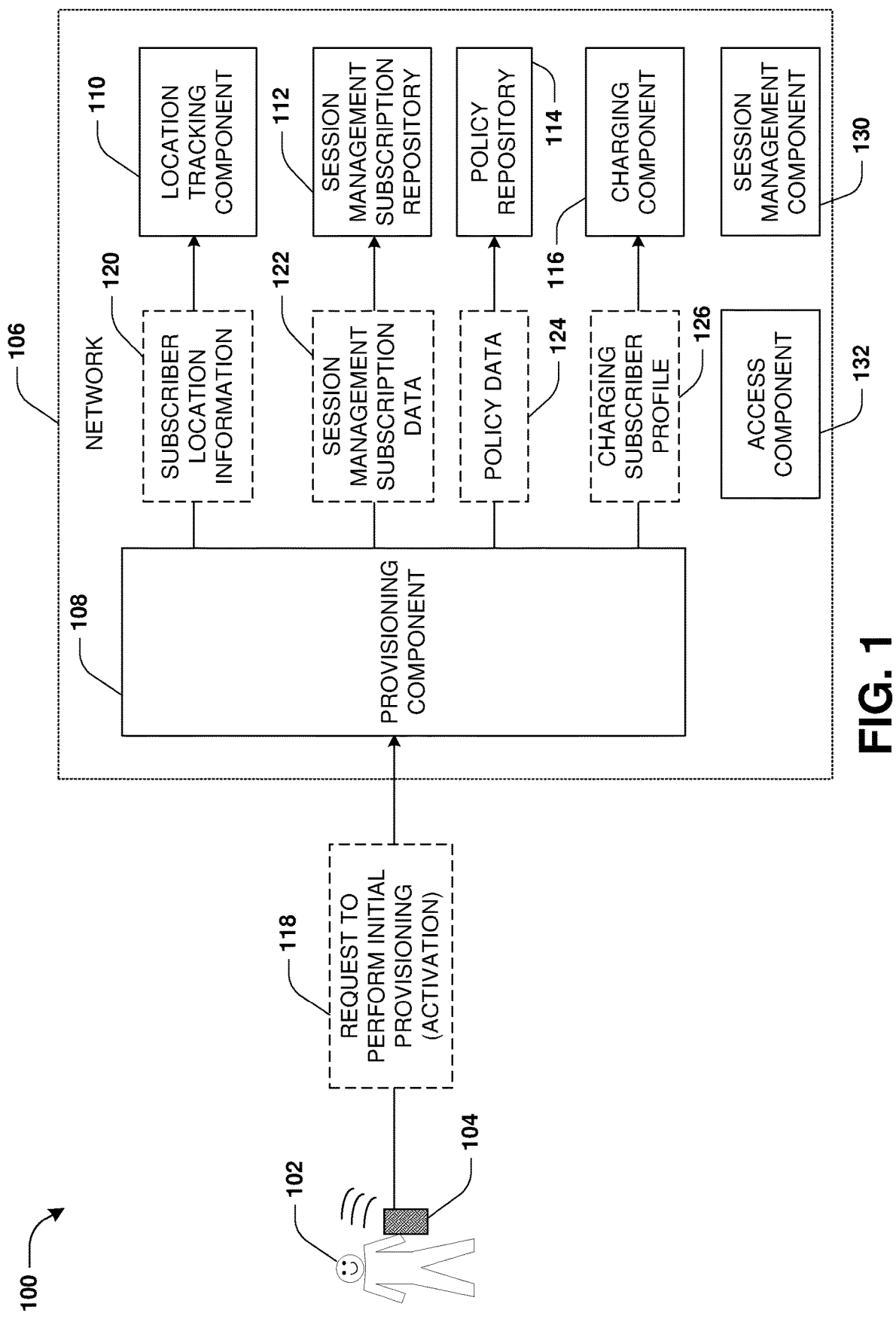
FIG. 1 is a diagram illustrating an example scenario associated with automated recovery to re-provision a subscriber of a communication network.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for automated recovery to re-provision a subscriber of a communication network are provided. In order for user equipment of a subscriber, such as a mobile device, a tablet, a vehicle navigation system, or other type of device, to communicate over a communication network, the subscriber must activate the device with the communication network. During activation, a mobile directory number (a phone number) may be assigned to the user equipment. Various information about the subscriber, the user equipment, and/or a subscription plan for the user equipment to use the communication network may be registered and tracked by components of the communication network. Once activated, the subscriber may use the user equipment to access and utilize the communication network according to the subscription, such as to make and receive phone calls, access services, run applications that use data communicated over the communication network, etc.

If a problem occurs during activation of the user equipment, then the user equipment may not be able to connect to and/or utilize the communication network. Activation may fail if there is a failure to provision a subscriber's phone number into a subscriber location function of a location tracking component. In some embodiments, a subscriber location, tracked by the location tracking component, is based on a subscriber billing address, as opposed to a current location of the subscriber. Thus, the location charging component may lack the subscriber location information for the subscriber. Activation may fail if there is a failure to store session management subscription data within a session management subscription repository. Thus, the session management subscription repository may lack information relating to what functionality the subscribed is allowed to access and is restricted from accessing, such as 4G functionality, 5G functionality, calling functionality, data, internet, etc. Activation may fail if there is a failure to register a charging subscriber profile with a charging component. Thus, the charging component may lack information related to a subscription level of the subscriber, how to track and charge for network utilization, etc. These failures may occur due to internal network errors, transport issues, etc.

If activation does not successfully complete, then the user equipment will be unable to connect to the communication network. The user equipment may continually attempt to reconnect to the communication network, which wastes network bandwidth, computing resources, and/or power consumption because the reconnection attempts will fail since the user equipment has not been successfully activated with the communication network. This results in service interruptions for the subscriber because the user equipment cannot utilize the communication network. Manually correcting the activation/provisioning issue can be time-consuming and tedious, which results in prolonged service interruption for the subscriber and user equipment.

Accordingly, as provided herein, automated recovery is implemented to re-provision the subscriber and user equipment to the communication network. In some embodiments, the automated recovery is implemented for situations where a portion of the provisioning of user equipment has been successfully performed such that the user equipment could use the communication network, but other provisioning has failed such that utilization of the communication network by the user equipment cannot be tracked by a charging component and charged to the subscriber. Conventionally, the communication network would return an error when the user equipment attempts to connect to the communication network because of the failure to provision the user equipment for utilization tracking and charging. Instead of returning such an error and preventing the user from even accessing the network, an embodiment of this disclosure describes an automated recovery that is performed where the user equipment is permitted use of the communication network, and re-provisioning attempts for utilization tracking and charging are performed. During the automated recovery, utilization of the communication network by the user equipment is tracked. Once the user equipment is re-provisioned, then the tracked utilization is accounted for by the charging component.

The automated recovery may be triggered during the establishment of a communication session for the user equipment. During the communication session establishment, a "subscriber not found" error may be received from a charging component configured to track network and service utilization by the user equipment of the subscriber. The "subscriber not found" error may be received because a failure occurred during registration of the charging subscriber profile with the charging component of the communication network used for tracking, accounting and service utilization by the user equipment according to a subscription plan of the subscriber for the user equipment (UE) with the communication network. Conventionally, an error may be returned to the UE and the UE will fail to connect to the communication network. In some aspects, an automated recovery process may be triggered to implement an automated self-healing action, in lieu of returning an error to the UE.

As part of the automated recovery, a success message may be provided back to the user equipment so that the user equipment can connect to and utilize the communication network. The utilization by the user equipment, such as date and time utilization, may be tracked during the automated recovery so that the charging component receives information regarding utilization of the UE once automated recovery has been performed. The automated self-healing action may include retrieving the charging subscriber profile from the session management subscription repository. Unlike conventional activation (provisioning) of a user equipment of a subscriber where merely session management subscription data is stored within the session management subscription repository, the session management subscription repository is modified to now additionally store the charging subscriber profile used by the charging component to track network and service utilization by the user equipment. The charging subscriber profile may be used to re-provision the subscriber with the charging component.

Once successfully re-provisioned, the user equipment will be successfully activated and can utilize the communication network, and thus the communication session (e.g., a PDU session) can be established. Network and service utilization by the user equipment during the automated recovery may be provided to the charging component in order to account for such utilization. In this way, the automated recovery may be seamlessly performed in a transparent manner to the subscriber and user equipment because the user equipment is allowed to access and utilize the communication network during the automated recovery, thus reducing or eliminating service interruptions. The automated recovery is performed by components within the communication network without the need for manual intervention, which is otherwise time consuming and tedious.

FIG. 1 illustrates a system 100 for performing an initial provisioning to activate a user equipment 104 of a subscriber 102 for connecting to and utilizing a communication network 106. The user equipment 104 may transmit a request 118 for performing the initial provisioning to a provisioning component 108 of the communication network 106. The provisioning component 108 may determine a location of the subscriber 102 (e.g., based upon a billing address), such as where the subscriber 102 will use the user equipment 104 in a particular region (e.g., an eastern region where the subscriber 102 lives). The provisioning component 108 may generate subscriber location information 120 based upon the location of the subscriber 102. The subscriber location information 120 may be provided to a location tracking component 110. In some embodiment, the location tracking component 110 may implement a subscriber location function that provides information about home subscriber server (HSS).

As part of performing the initial provisioning, session management subscription data 122 may be stored within a session management subscription repository 112. The session management subscription data 122 may describe what the subscriber is allowed to do and what the subscribe is restricted from doing, such as whether the subscriber is allowed to use 4G radio, 5G radio, voice calling, data and internet, etc. In some embodiments, the session management subscription repository 112 may be a unified data repository (UDR) accessible through a unified data management (UDM) interface. The UDM may be a centralized way to control subscriber data, and the UDR may be a converged repository of subscriber data and may be used to service network functions.

As part of performing the initial provisioning, policy data 124 may be stored within a policy repository 114. The policy data 214 may specify various levels of service that the subscriber can utilize, such as 720p video or other video resolutions, patterning at 600 kilobits or other data rates, etc. In some embodiments, the policy repository 114 may implement a policy control function (PCF) that supports a unified policy framework to govern network behavior such as data transfer rates, video services at particular resolutions, etc.

As part of performing the initial provisioning, a charging subscriber profile 216 may be registered with a charging component 116. The charging subscriber profile 216 may specify a subscription plan of the subscriber (e.g., a premium plan, a basic plan, etc.), and thus may indicate how to track and charge the subscriber for network and service utilization of the communication network 106. In some embodiments, the charging component 116 implements a core charging function that enables the ability to track and charge for service utilized through to the communication network 106.

The communication network 106 may comprise other components such as a session management component 130. The session management component 130 may implement a session management function for creating, updating, and removing protocol data unit (PDU) sessions and management session context with user plane functions (UPF). The communication network may comprise an access component 132. The access component 132 may implement an access and mobility management function as a control plane function for managing handovers between base stations (e.g., gNodeBs), device registration/activation (e.g., a UE registering with a 5G system), reachability management, connection management (e.g., establish and release control plane signal connections between the access component 132 and a UE), and mobility management.

If the user equipment 104 is successfully activated by the initial provisioning, then the user equipment 104 will be allowed to connect to and utilize the communication network 106. Otherwise, if there is a failure during the initial provisioning and the user equipment 104 is not activated, then the user equipment 104 will be unable to connect to and utilize the communication network 106, which can lead to service interruptions, manual intervention and troubleshooting, wasted resources in failed attempts to reconnect, etc. As will be further described in relation to FIGS. 2 and 5, instead of the failure resulting in the user equipment being unable to connect to and utilize the communication network 106, the user equipment 104 will still be allowed to connect to and utilize the communication network 106, and an automated self-healing action may be performed to re-provision the subscriber to re-activate the user equipment 104.

Figure 2:
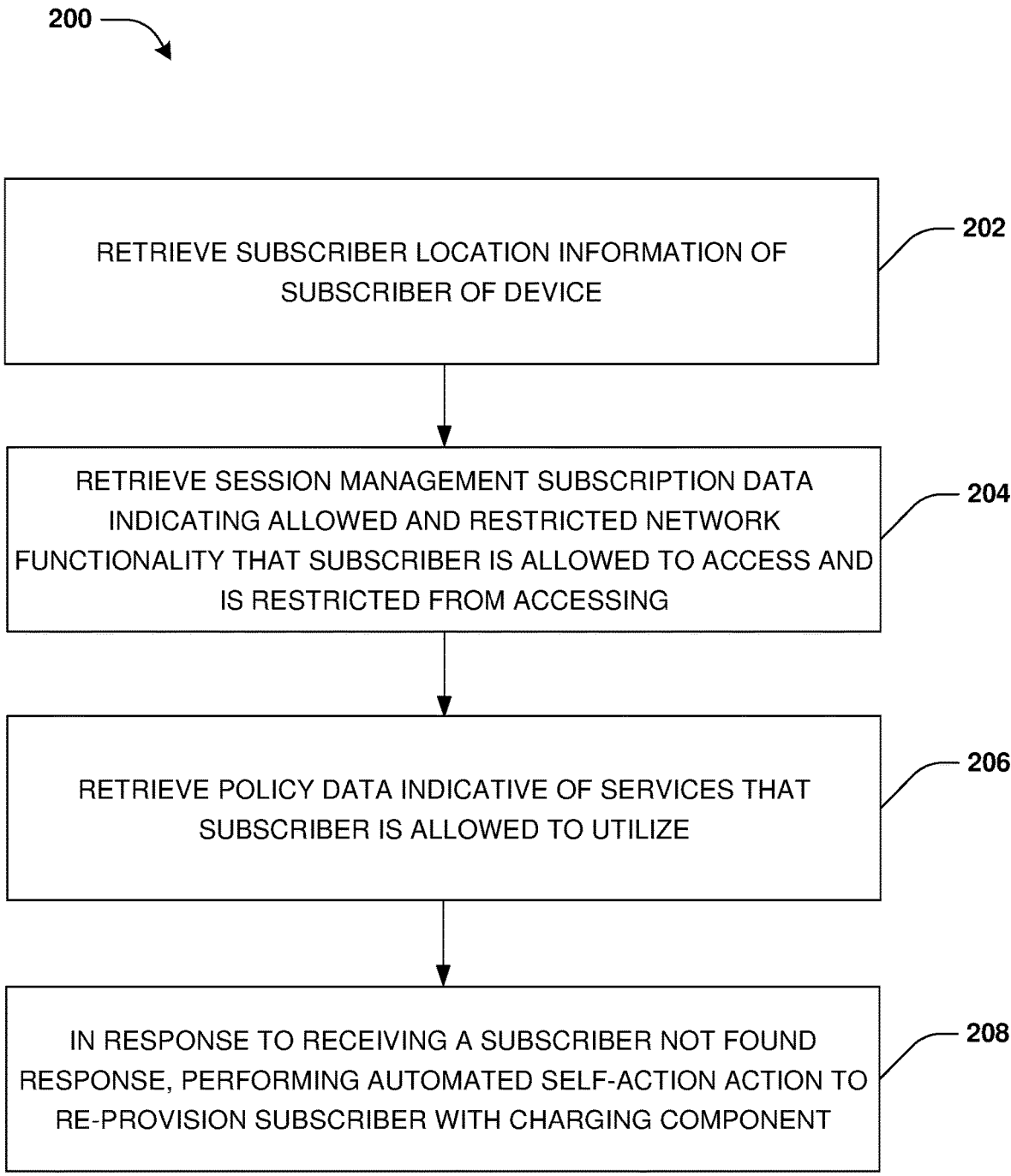
FIG. 2 is a flow chart illustrating an example method for automated recovery to re-provision a subscriber of a communication network.

FIG. 2 illustrates an example of a method 200 for automated recovery to re-provision a subscriber of a communication network, which is further described in conjunction with the system 100 of FIG. 1. The initial provisioning of the subscriber 102 to activate the user equipment 104 with the communication network 106 may have been attempted. During the initial provisioning, the charging subscriber profile 126 may have been stored into the session management subscription repository 112. The charging subscriber profile 126 may be stored within the session management subscription repository 112 for subsequent access by the session management component 130 for re-provisioning the subscriber 102 in the event there was a failure to initially provision the subscriber 102 to activate the user equipment 104. In some embodiments, the initial provisioning failed such that the charging subscriber profile 126 was never registered with the charging component 116. However, the subscriber location information 120 may have been successfully stored with the location tracking component 110, the session management subscription data 122 and the charging subscriber profile 126 may have been successfully stored within the session management subscription repository 112, and/or the policy data 124 may have been successfully stored within the policy repository 114. In some embodiments, the user equipment 104 may be unaware of the failure to provision the subscriber 102.

After failure of the initial provisioning of the subscriber 102, the user equipment 104 may attempt to connect to the communication network 106. The user equipment 104 may transmit a communication session establishment request to utilize the communication network 106. In some embodiments, the communication session establishment request may correspond to a PDU session establishment request. In this way, the session management component 130 may receive the communication session establishment request for the user equipment 104 of the subscriber 102 to utilize the communication network 106. In some embodiments, the session management component 130 may receive the communication session establishment request through the access component 132.

During operation 202 of method 200, the session management component 130 may retrieve the subscriber location information 120 from the location charging component 110. This subscriber location information 120 may be used to establish the communication session (e.g., a PDU session). In particular, IT provisions three types of network functions, which includes a subscriber location function that stores a subscriber billing location (as opposed to a current physical location). Session management information and policy data is also provisioned into a session management subscription repository and policy repository for the subscriber billing location, while a billing plan is provisioned to a charging component for the subscriber billing location. As part of establishing the communication session, the subscriber location information 120 is obtained and used to know the location of the session management subscription repository, policy repository, and the charging component.

The subscriber location information 120 may be used to establish the session (e.g., the PDU session) for the user equipment 104 to connect to and utilize the communication network 106 such as for making phone calls and/or accessing the internet, service, and data over the communication network 106.

During operation 204 of method 200, the session management component 130 may retrieve the session management subscription data 122 from the session management subscription repository 112 (e.g., from the unified data repository through the unified data management interface). The session management subscription data 122 may indicate allowed network functionality of the communication network 106 that the subscriber 102 is allowed to access and restricted network functionality of the communication network 106 that the subscriber 102 is restricted from accessing. The session management subscription data 122 may be used to establish the session (e.g., the PDU session) for the user equipment 104 to connect to and utilize the communication network 106 such as for making phone calls and/or accessing the internet, service, and data over the communication network 106.

During operation 206 of method 200, the session management component 130 may retrieve the policy data 124 from the policy repository 114 (e.g., from the policy control function). The policy data 124 may indicate services of the communication network 106 that the subscriber 102 is allowed to utilize, such as particular video streaming services of particular video resolutions, audio streaming services of particular bit stream sizes, etc. The policy data 124 may be used to establish the session (e.g., the PDU session) for the user equipment 104 to connect to and utilize the communication network 106 such as for making phone calls and/or accessing the internet, service, and data over the communication network 106.

The session management component 130 may transmit a charging subscriber request to the charging component 116 (e.g., to the core charging function) for the charging component 116 to track network and service utilization of the communication network 106 by the user equipment 104. Because of the prior failure during the initial provisioning of the subscriber 102 to activate the user equipment 104 for connecting to and utilizing the communication network 106, the charging component 116 never registered the charging subscriber profile 126. Because the charging component 116 never registered the charging subscriber profile 126, the charging component 116 will return a "subscriber not found" response to the session management component 130.

During operation 208 of method 200, in response to the session management component 130 receiving the "subscriber not found" response, the session management component 130 performs an automated self-healing action as part of an automated recovery process to re-provision the subscriber 102 to activate the user equipment 104 for connecting to and utilizing the communication network 106. As part of the automated self-healing action, the session management component 130 may refrain from sending an error code to the access component 132 (e.g., to the access and mobility management function) in response to receiving the subscriber not found response, which the session management component 130 would normally have done. Instead, the session management component 130 may transmit a success message to the access component 132 in response to receiving the "subscriber not found" response. In some embodiments, the session management component 130 hides the error, and instead returns the success message. In this way, the access component 132 provides the user equipment 104 with access to the communication network 106 so that the user equipment 104 can utilize the communication network 106 (e.g., make phone calls, access services, send/receive data, access the internet, etc.) even though the subscriber not found response was received. This enables the ability to perform the automated self-healing action transparently without subscriber 102 experiencing service interruptions. Thus, the subscriber 102 and the user equipment 104 can connect to and utilize the communication network 106 during the performance of the automated self-healing action, such as before completion of the automated self-healing action. The session management component 130 may track network and service utilization by the user equipment 104 during the performance of the automated self-healing action since the charging component 116 is unable to locate the subscriber 102 and track such network and service utilization.

As part of performing the automated self-healing action, the session management component 130 may retrieve the charging subscriber profile 126 that was previously stored within the session management subscription repository 112. The charging subscriber profile 126 may specify how to track network and service utilization of the communication network 160 by the subscriber 102. The session management component 130 may transmit the charging subscriber profile 126 to the charging component 116 to re-provision the subscriber 102 with the charging component 116. The charging component 116 may utilize the charging subscriber profile 126 to generate a subscriber profile to track the utilization of the communication network 160 by the subscriber 102. In this way, the subscriber 102 will be re-provisioned to successfully activate the user equipment 104 for connecting to and utilizing the communication network 106. In some embodiments, a log of performing the automated self-healing action may be generated and/or provided for post-processing validation review to ensure that the subscriber 102 is correctly re-provisioned and the user equipment 104 is correctly activated, such as to determine whether the subscriber profile is accurate and correct.

In some embodiments, the session management component 130 may provide the charging component 116 with the network and service utilization of the user equipment 104 tracked by the session management component 130 during the performance of the automated self-healing action. In this way, the charging component 116 may combine the received network and service utilization from the session management component 130 with subsequent network and service utilization tracked by the charging component 116 in order to accurately track all network and service utilization of the communication network 106 by the user equipment 104.

Figure 3:
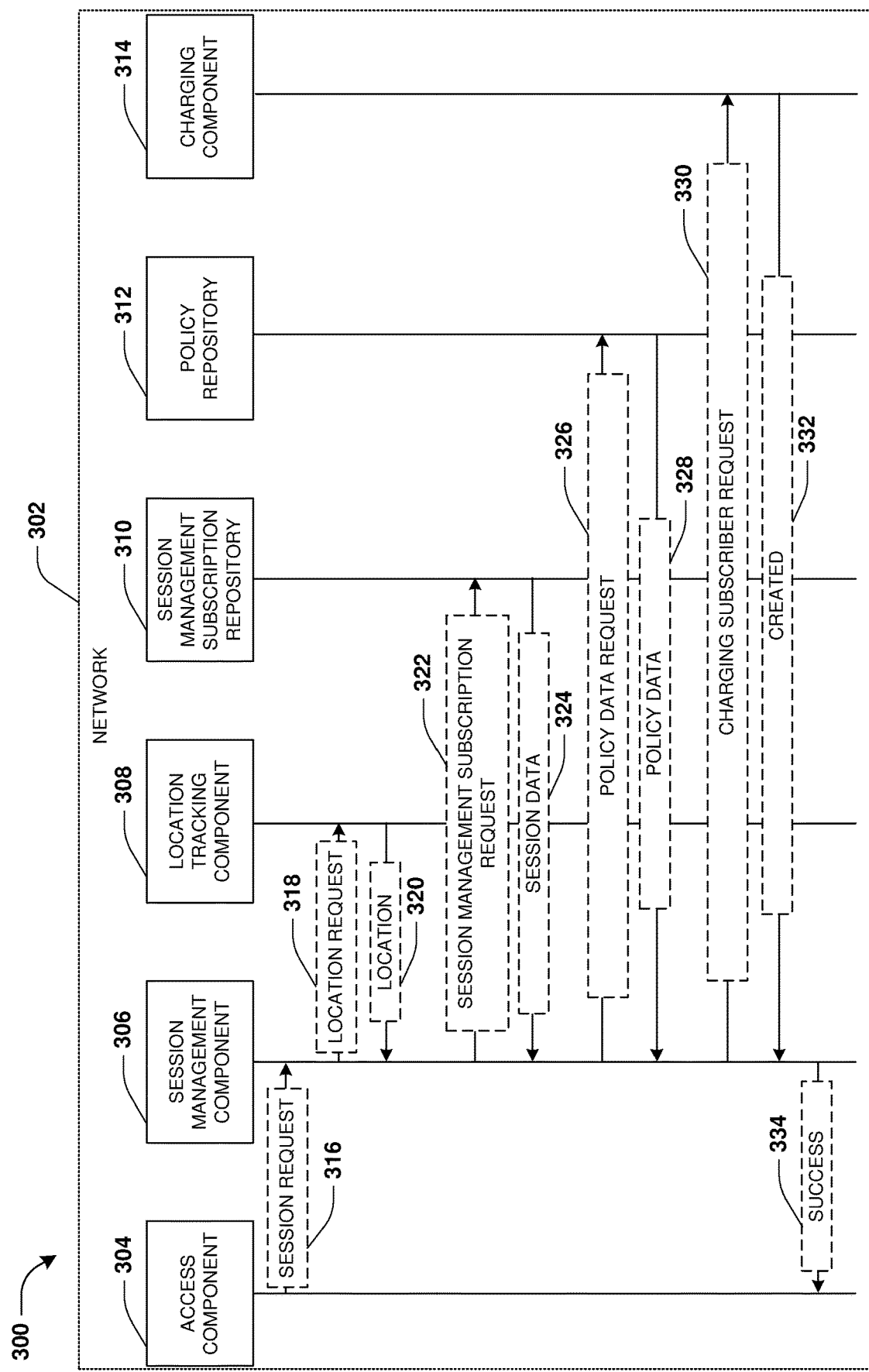
FIG. 3 is a diagram illustrating an example scenario of a communication session successfully being established.

FIG. 3 illustrates a system 300 of a communication network 302 successfully establishing a communication session for a user equipment. The user equipment may attempt to establish the communication session through an access component 304. The access component 304 may transmit a communication session establishment request 316 to a session management component 306. The session management component 306 may transmit a request 318 to a location tracking component 308 for subscriber location information 320 for use in establishing the communication session for the user equipment. The session management component 306 may transmit a session management subscription request 322 to a session management subscription repository 310 for session management subscription data 324 for use in establishing the communication session for the user equipment. The session management component 306 may transmit a policy data request 326 to a policy repository 312 for policy data 328 for use in establishing the communication session for the user equipment. The session management component 306 may transmit a charging subscriber request 330 to a charging component 314 for tracking network and service utilization by the user equipment during the communication session. In response to receiving the subscriber location information 320, the session management subscription data 324, policy data 328, and a success response 332 to the charging subscriber request 330, the session management component 306 transmits a success message 334 to the access component 304 that will allow the user equipment to connect to and utilize the communication network 302.

Figure 4:
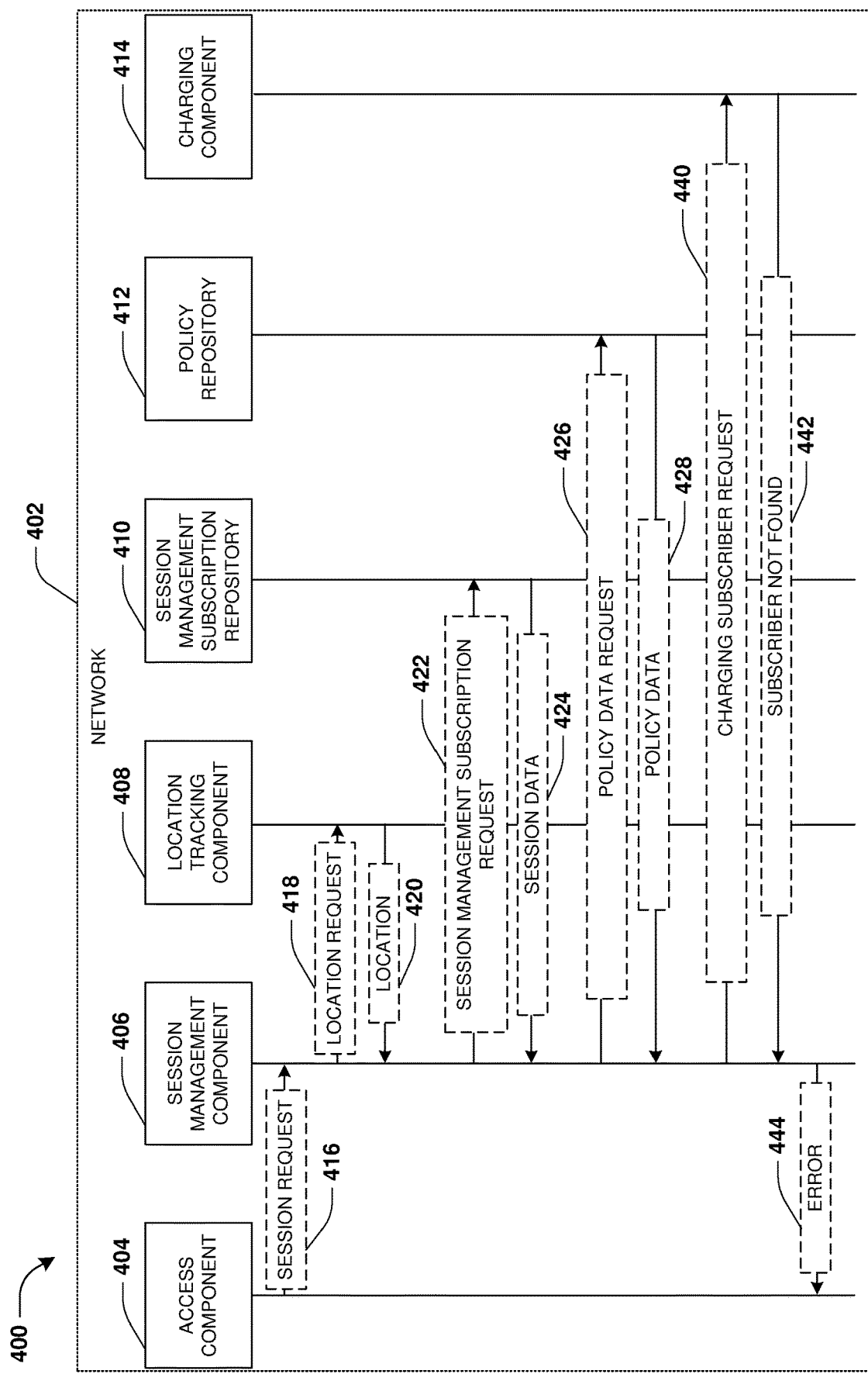
FIG. 4 is a diagram illustrating an example scenario of a communication session unsuccessfully being established.

FIG. 4 illustrates a system 400 of a communication network 402 unsuccessfully establishing a communication session for a user equipment. The user equipment may attempt to establish the communication session through an access component 404. The access component 404 may transmit a communication session establishment request 416 to a session management component 406. The session management component 406 may transmit a request 418 to a location tracking component 408 for subscriber location information 420 for use in establishing the communication session for the user equipment. The session management component 406 may transmit a session management subscription request 422 to a session management subscription repository 410 for session management subscription data 424 for use in establishing the communication session for the user equipment. The session management component 406 may transmit a policy data request 426 to a policy repository 412 for policy data 428 for use in establishing the communication session for the user equipment.

The session management component 406 may transmit a charging subscriber request 430 to a charging component 414 for tracking network and service utilization by the user equipment during the communication session. There may be a failure to provision a subscriber of the user equipment with the charging component 414, and thus the charging component 414 may not have a subscriber profile (charging subscriber profile) for the subscriber. Accordingly, the charging component 414 may respond with a subscriber not found 442 response to the session management component 406. Without the techniques provided herein for automated recovery by implementing an automated self-healing action, the session management component 406 returns an error message 444 to the access component 404 that will refrain from establishing the communication session, and will deny the user equipment from accessing the communication network 402.

Figure 5:
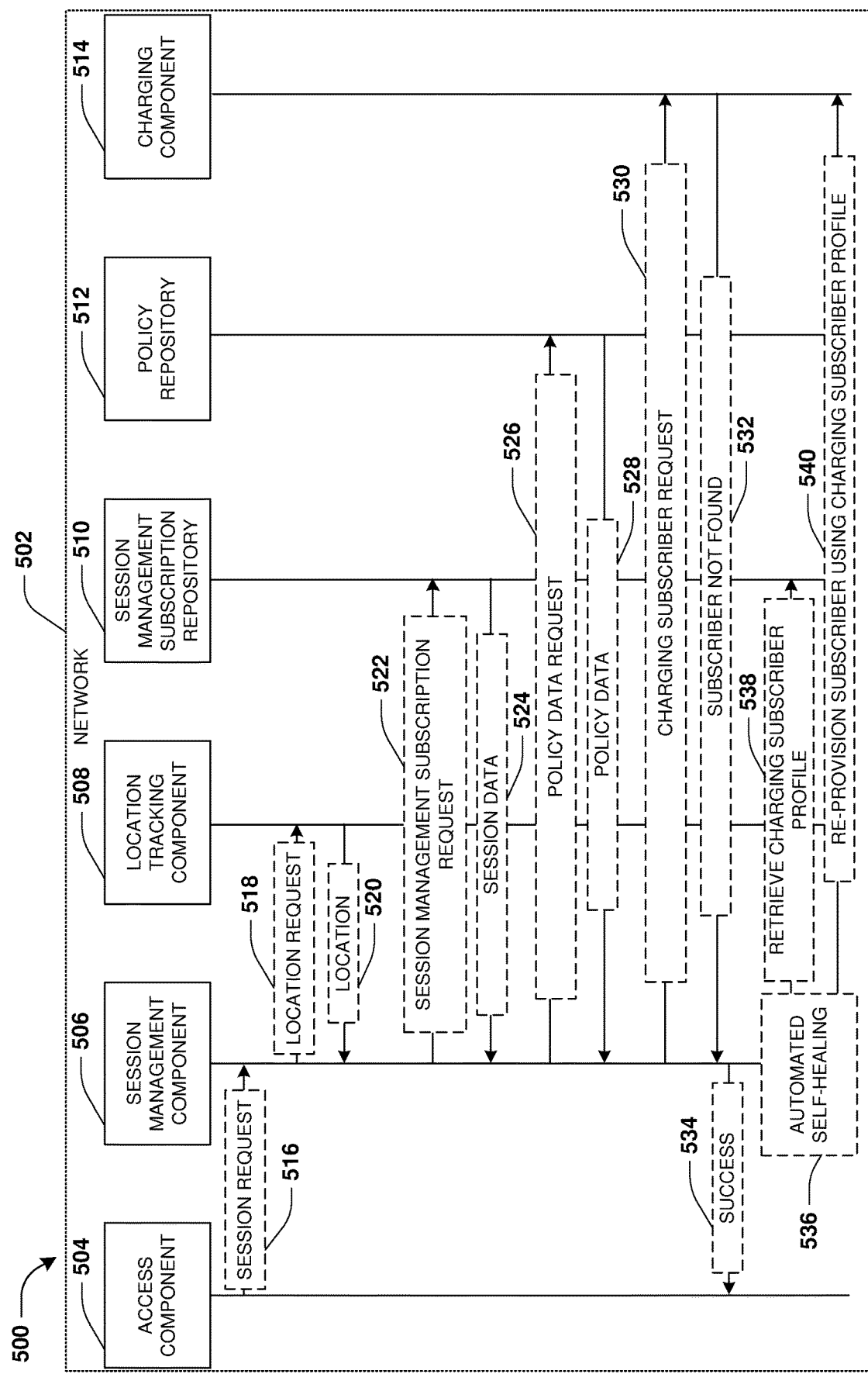
FIG. 5 is a diagram illustrating an example scenario associated with automated recovery to re-provision a subscriber of a communication network.

FIG. 5 illustrates a system 500 of a communication network 502 successfully establishing a communication session for a user equipment by performing an automated self-healing action. The user equipment may attempt to establish the communication session through an access component 504. The access component 504 may transmit a communication session establishment request 516 to a session management component 506. The session management component 506 may transmit a request 518 to a location tracking component 508 for subscriber location information 520 for use in establishing the communication session for the user equipment. The session management component 506 may transmit a session management subscription request 522 to a session management subscription repository 510 for session management subscription data 524 for use in establishing the communication session for the user equipment. The session management component 506 may transmit a policy data request 526 to a policy repository 512 for policy data 528 for use in establishing the communication session for the user equipment.

The session management component 506 may transmit a charging subscriber request 530 to a charging component 514 for tracking network and service utilization by the user equipment during the communication session. There may be a failure to provision a subscriber of the user equipment with the charging component 514, and thus the charging component 514 may not have a subscriber profile (charging subscriber profile) for the subscriber. Accordingly, the charging component 514 may respond with a subscriber not found 542 response to the session management component 506. Instead of returning an error message to the access component 504, the session management component 506 transmits a success message 534 to the access component 504 that will allow the user equipment to connect to and utilize the communication network 502. The session management component 506 implements an automated self-healing action 536 to re-provision the subscriber with the charging component 514. The session management component 506 retrieves a charging subscriber profile 538 from the session management subscription repository 510. The session management component 506 uses the charging subscriber profile 538 to re-provision the subscriber with the charging component 514 in order to successfully establish the communication session for the user equipment.

In some embodiments of implementing automated recovery to re-provision a subscriber of a communication network, a new data set is created within a session management subscription repository (e.g., a UDR) to store a charging subscriber profile during initial provisioning of a subscriber to activate a user equipment with the communication network. The session management subscription repository (e.g., a UDM) is configured with a new service-based architecture (SBA) service interface so that a session management component can retrieve the charging subscriber profile from the session management subscription repository. The SBA service interface provides access to control plane functionality and repositories of a communication network, such as a 5G network. The session management component is configured with a trigger "Assume Positive" for communication session establishment even though a "subscriber not found" response may be received from a charging component during communication session establishment. The trigger "Assume Positive" causes the session management component to ignore the error (the "subscriber not found" response), and instead return a success response to the user equipment. The session management component is configured to trigger the automated recovery when the subscriber not found response is received. The charging component is configured with a new SBA service interface so that the session management component can send the charging component a charging subscriber create request that includes the charging subscriber profile. The charging component is configured to create a subscriber profile based upon the charging subscriber profile within the charging subscriber create request.

According to some embodiments, a method may be provided. The method includes in response to receiving a communication session establishment request for a user equipment of a subscriber to utilize a network, retrieving subscriber location information. The method includes retrieving session management subscription data indicating allowed network functionality that the subscriber is allowed to access and restricted network functionality that the subscriber is restricted from accessing. The method includes retrieving policy data indicating services that the subscriber is allowed to utilize. The method includes in response to receiving a subscriber not found response from a charging component as a response to a charging subscriber request for tracking network and service utilization by the user equipment, performing an automated self-healing action to re-provision the subscriber with the charging component for registering the subscriber for network and service utilization tracking by the charging component.

According to some embodiments, the method includes retrieving a charging subscriber profile specifying how to track network and service utilization of the subscriber; and utilizing the charging subscriber profile to re-provision the subscriber with the charging component.

According to some embodiments, the method includes in response to receiving the subscriber not found response, refraining from sending an error code to an access component.

According to some embodiments, the method includes in response to receiving the subscriber not found response, sending a success message to an access component.

According to some embodiments, the method includes in response to receiving the subscriber not found response, providing the user equipment with access to the network.

According to some embodiments, the user equipment is provided with access to the network before completion of the automated self-healing action.

According to some embodiments, the user equipment is provided with access to the network before the automated self-healing action has finished re-provisioning the subscriber with the charging component.

According to some embodiments, the method includes tracking network and service utilization by the user equipment during the performance of the automated self-healing action.

According to some embodiments, the method includes in response to successfully re-provisioning the subscriber with the charging component, providing the network and service utilization to the charging component.

According to some embodiments, the method includes combining, by the charging component, the received network and service utilization with subsequent network and service utilization tracked by the charging component for the user equipment based upon the subscriber being re-provisioned with the charging component.

According to some embodiments, the method includes creating, by the charging component, a subscriber profile based upon charging subscriber profile data.

According to some embodiments, the method includes generating a log of performing the automated self-healing action; and providing the log for post processing validation review.

According to some embodiments, the method includes during an initial provisioning of the subscriber, storing a charging subscriber profile access for re-provisioning the subscriber.

According to some embodiments, the method includes performing the automated self-healing action transparent to the subscriber by allowing the user equipment to access the network during the automated self-healing action.

According to some embodiments, a computing user equipment is provided. The computing user equipment is configured to perform operations comprising in response to receiving a communication session establishment request for a user equipment of a subscriber to utilize a network, retrieving subscriber location information. The operations comprise retrieving session management subscription data indicating allowed network functionality that the subscriber is allowed to access and restricted network functionality that the subscriber is restricted from accessing. The operations comprise retrieving policy data indicating services that the subscriber is allowed to utilize. The operations comprise in response to receiving a subscriber not found response from a charging component as a response to a charging subscriber request for tracking network and service utilization by the user equipment, performing an automated self-healing action to re-provision the subscriber with the charging component for registering the subscriber for network and service utilization tracking by the charging component.

According to some embodiments, the operations include retrieving a charging subscriber profile specifying how to track network and service utilization of the subscriber; and utilizing the charging subscriber profile to re-provision the subscriber with the charging component.

According to some embodiments, the operations include in response to receiving the subscriber not found response, sending a success message, in replace of an error code, to an access component.

According to some embodiments, the operations include in response to receiving the subscriber not found response, providing the user equipment with access to the network during performance of the automated self-healing action.

According to some embodiments, a non-transitory computer-readable medium storing instructions that when executed facilitate performance of operations, is provided. The operations include in response to receiving a communication session establishment request for a user equipment of a subscriber to utilize a network, retrieving subscriber location information. The operations include retrieving session management subscription data indicating allowed network functionality that the subscriber is allowed to access and restricted network functionality that the subscriber is restricted from accessing. The operations include retrieving policy data indicating services that the subscriber is allowed to utilize. The operations include in response to receiving a subscriber not found response from a charging component as a response to a charging subscriber request for tracking network and service utilization by the user equipment, performing an automated self-healing action to re-provision the subscriber with the charging component for registering the subscriber for network and service utilization tracking by the charging component. The operations include providing the user equipment with access to the network during performance of the automated self-healing action.

According to some embodiments, the operations include retrieving a charging subscriber profile specifying how to track network and service utilization of the subscriber; and utilizing the charging subscriber profile to re-provision the subscriber with the charging component.

Figure 6:
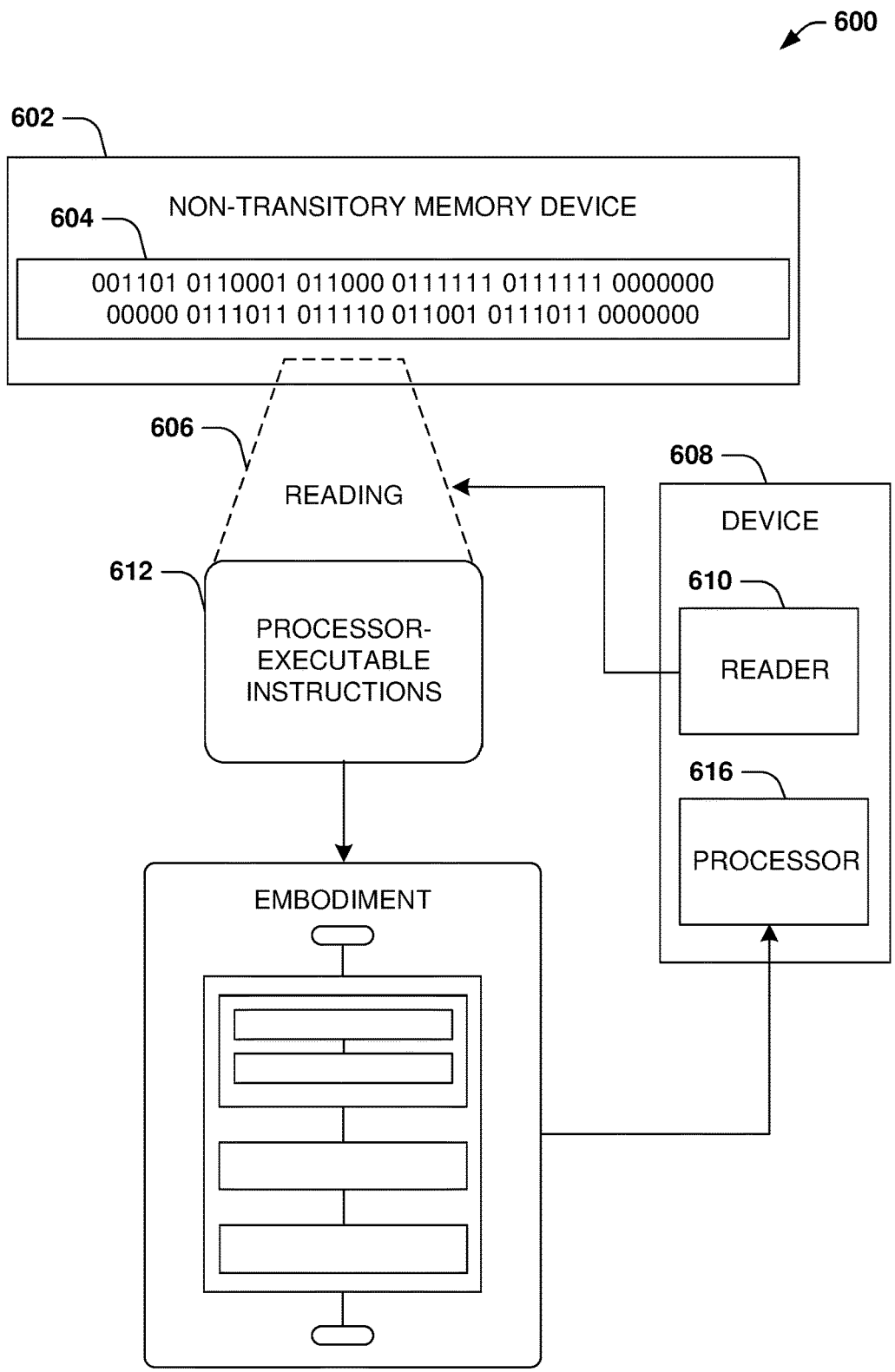
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 100 of FIG. 1, at least some of the example system 300 of FIG. 3, at least some of the example system 400 of FIG. 4, and/or at least some of the example system 500 of FIG. 5.

Figure 7:
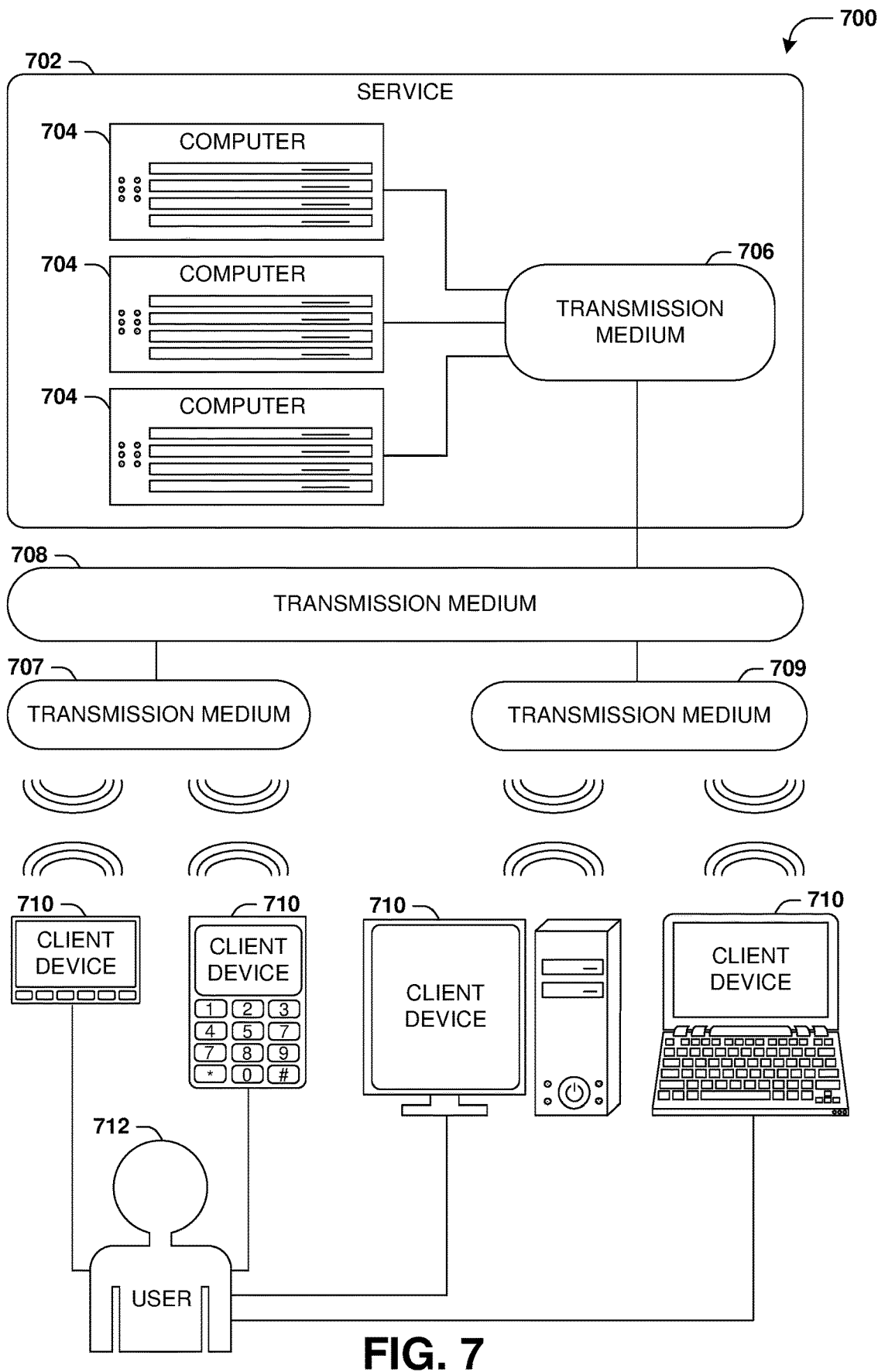
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 702.11) network or a Bluetooth (IEEE Standard 702.15.1) personal area network). In this manner, the computers 704 and the client devices 710 may communicate over various types of transmission mediums.

Figure 8:
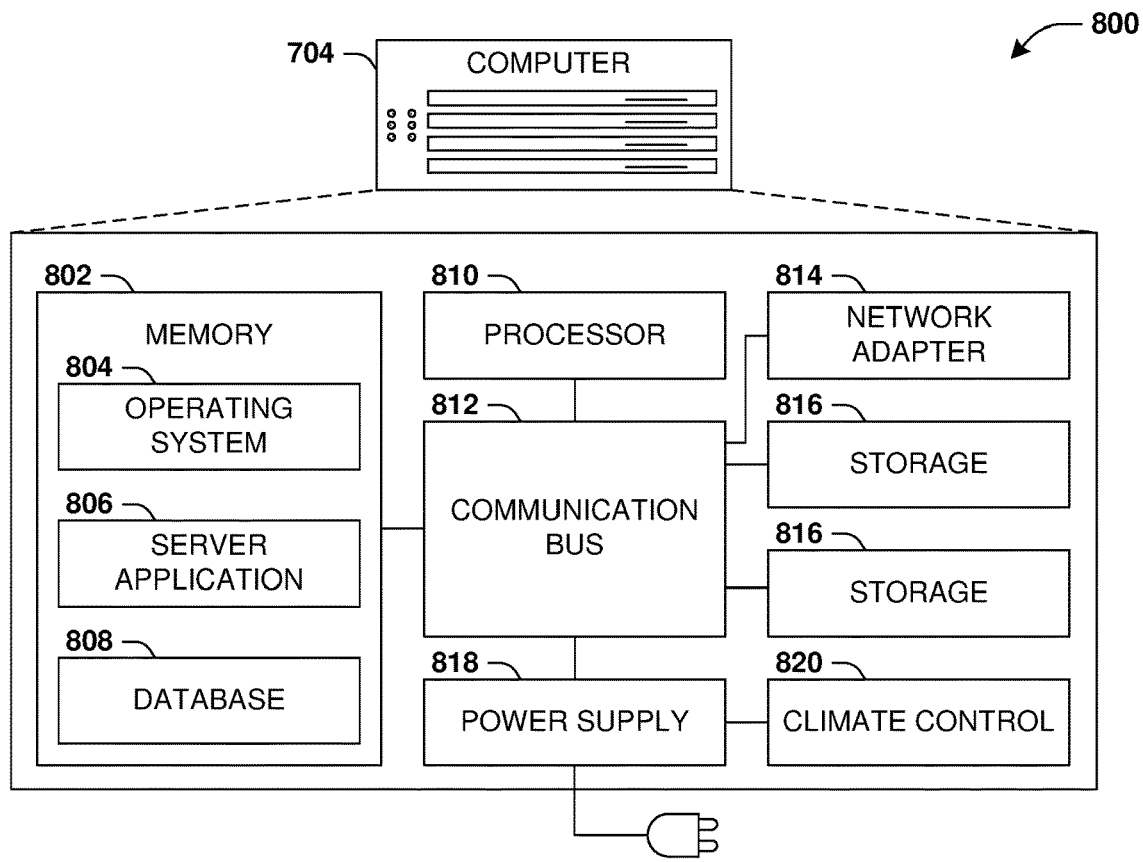
FIG. 8 is an illustration of a scenario involving an example configuration of a computer that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may comprise a shared and/or dedicated climate control unit 820 that regulates climate properties, such as temperature, humidity, and/or airflow. Many such computers 704 may be configured and/or adapted to utilize at least a portion of the techniques presented herein.

Figure 9:
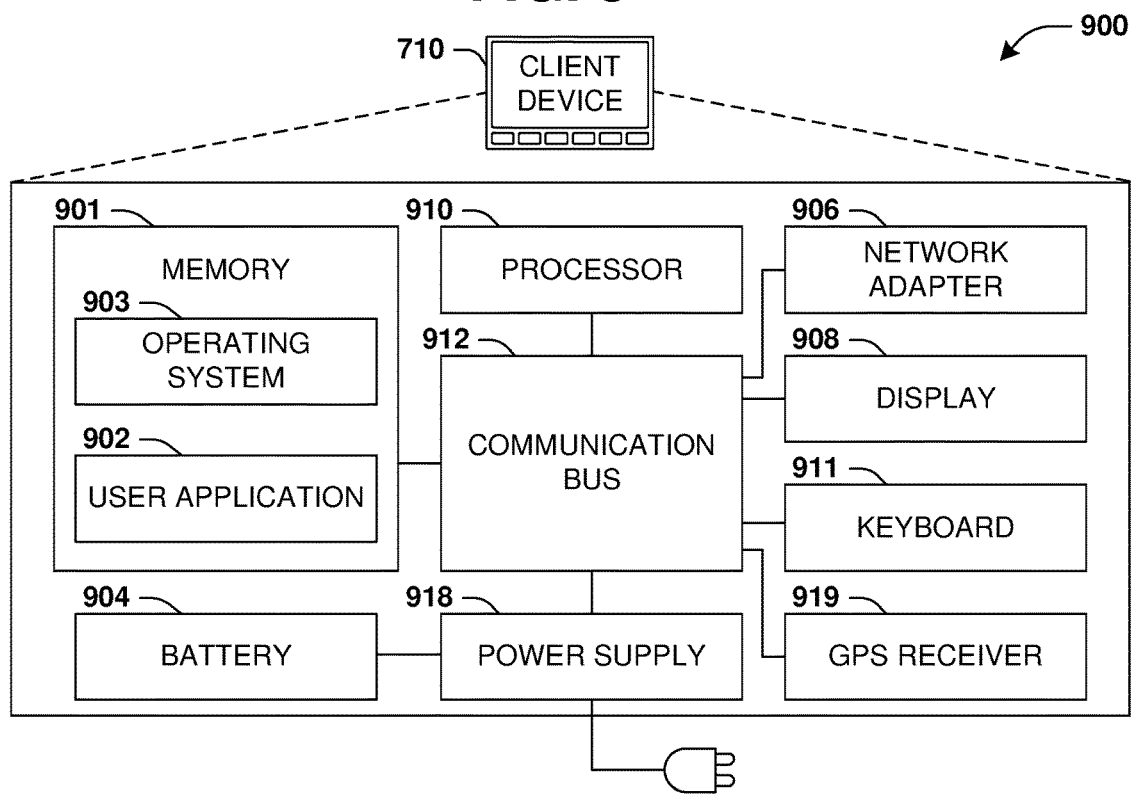
FIG. 9 is an illustration of a scenario involving an example configuration of a client that may utilize and/or implement at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed:

1. A method, comprising:
   in response to receiving a communication session establishment request for user equipment of a subscriber to utilize a network, retrieving subscriber location information;
   retrieving session management subscription data indicating allowed network functionality;
   retrieving policy data indicating services that the subscriber is allowed to utilize; and
   in response to receiving a subscriber not found response from a charging component of the network, performing an automated self-healing action to re-provision the subscriber with the charging component, wherein the automated self-healing action is performed in conjunction with continuing establishment of the communication session for allowing the user equipment to utilize the network.

2. The method of claim 1, wherein the performing the automated self-healing action comprises:
   retrieving a charging subscriber profile specifying how to track network and service utilization of the subscriber; and utilizing the charging subscriber profile to re-provision the subscriber with the charging component.

3. The method of claim 1, wherein the performing the automated self-healing action comprises:
in response to receiving the subscriber not found response, refraining from sending an error code to an access component.

4. The method of claim 1, wherein the performing the automated self-healing action comprises:
in response to receiving the subscriber not found response, sending a success message to an access component.

5. The method of claim 1, wherein the performing the automated self-healing action comprises:
in response to receiving the subscriber not found response, providing the user equipment with access to the network.

6. The method of claim 5, comprising:
establishing the communication session and allowing the user equipment to access the network before completion of the automated self-healing action.

7. The method of claim 1, comprising:
tracking information associated with the re-provisioning of the subscriber within a log.

8. The method of claim 5, wherein the performing the automated self-healing action comprises:
tracking network and service utilization by the user equipment during the performance of the automated self-healing action.

9. The method of claim 8, wherein the performing the automated self-healing action comprises:
in response to successfully re-provisioning the subscriber with the charging component, providing the network and service utilization to the charging component.

10. The method of claim 9, comprising:
combining, by the charging component, the received network and service utilization with subsequent network and service utilization tracked by the charging component for the user equipment based upon the subscriber being re-provisioned with the charging component.

11. The method of claim 1, wherein the performing the automated self-healing action comprises:
creating, by the charging component, a subscriber profile based upon charging subscriber profile data.

12. The method of claim 1, wherein the performing the automated self-healing action comprises:
generating a log of performing the automated self-healing action; and
providing the log for post-processing validation review.

13. The method of claim 1, comprising:
during an initial provisioning of the subscriber, storing a charging subscriber profile access for re-provisioning the subscriber.

14. A computing device comprising:
one or more processors configured for performing operations comprising:
in response to receiving a communication session establishment request for a user equipment of a subscriber to utilize a network, retrieving subscriber location information;
retrieving session management subscription data indicating allowed network functionality that the subscriber is allowed to access and restricted network functionality that the subscriber is restricted from accessing;
retrieving policy data indicating services that the subscriber is allowed to utilize; and
in response to receiving a subscriber not found response from a charging component as a response to a charging subscriber request for tracking network and service utilization by the user equipment, performing an automated self-healing action to re-provision the subscriber with the charging component for registering the subscriber for network and service utilization tracking by the charging component.

15. The computing device of claim 14, wherein the operations comprise:
retrieving a charging subscriber profile specifying how to track network and service utilization of the subscriber; and
utilizing the charging subscriber profile to re-provision the subscriber with the charging component.

16. The computing device of claim 14, wherein the operations comprise:
in response to receiving the subscriber not found response, sending a success message, in replace of an error code, to an access component.

17. The computing device of claim 14, wherein the operations comprise:
in response to receiving the subscriber not found response, providing the user equipment with access to the network during performance of the automated self-healing action.

18. A non-transitory computer-readable medium storing instructions that when executed facilitate performance of operations comprising:
in response to receiving a communication session establishment request for a user equipment of a subscriber to utilize a network, retrieving subscriber location information;
retrieving session management subscription data indicating allowed network functionality that the subscriber is allowed to access and restricted network functionality that the subscriber is restricted from accessing;
retrieving policy data indicating services that the subscriber is allowed to utilize;
in response to receiving a subscriber not found response from a charging component as a response to a charging subscriber request for tracking network and service utilization by the user equipment, performing an automated self-healing action to re-provision the subscriber with the charging component for registering the subscriber for network and service utilization tracking by the charging component; and
providing the user equipment with access to the network during performance of the automated self-healing action.

19. The non-transitory computer-readable medium of claim 18, wherein the operations comprise:
retrieving a charging subscriber profile specifying how to track network and service utilization of the subscriber; and
utilizing the charging subscriber profile to re-provision the subscriber with the charging component.

20. The non-transitory computer-readable medium of claim 18, wherein the operations comprise:
performing the automated self-healing action transparent to the subscriber by allowing the user equipment to access the network during the automated self-healing action and refraining from providing an error code to the user equipment.

* * * * *